Patented Nov. 27, 1928.

1,692,927

UNITED STATES PATENT OFFICE.

WILLIAM S. CALCOTT AND HERBERT W. DAUDT, OF PENNS GROVE, NEW JERSEY, ASSIGNORS TO E. I. DU PONT DE NEMOURS & COMPANY, OF WILMINGTON, DELAWARE, A CORPORATION OF DELAWARE.

MANUFACTURE OF BENZOATES.

No Drawing. Application filed September 13, 1924, Serial No. 737,608 Renewed February 27, 1928.

This invention is on the art of manufacture of benzoates, particularly water soluble white benzoates, and has particular application in the manufacture of benzoates of the alkali metals, including ammonium. It relates especially to a process for the removal of discoloration due to certain impurities of unknown composition which, in themselves, cannot be entirely removed by treatment with activated carbon. The difficulty is, apparently, inherent in the crude benzoic acid used for making the benzoates, for example, the crude benzoic acid made from phthalic acid by the process disclosed by H. W. Daudt, one of the present applicants, in his U. S. Patent No. 1,551,373, August 25, 1925, on process of making benzoic acid. We have devised a process whereby it is possible to eliminate the discoloration mentioned when using crude benzoic acid, wherefore there is avoided the necesity of using costly sublimed benzoic acid, while yet obtaining benzoates of satisfactory color. It is the principal object of the present invention to provide such a process.

We have discovered that the products of oxidation, by alkali permanganates, of the aforesaid impurities can be removed by treatment with carbon, preferably activated carbon, and our process is based upon this discovery. In accordance with the invention the general procedure may be as follows, it being understood that the procedure given is but illustrative, the invention not being confined to the details of the example:—

To 2000 pounds of a 10–20% aqueous solution of alkali benzoate, which has been prepared by the neutralization of crude benzoic acid, for example, that made from phthalic acid as above mentioned, add sufficient alkali permanganate to impart a red color to the solution. Maintain a temperature of 80 to 95° C. for 5 to 15 minutes. Next add 5 to 10 pounds of activated carbon and continue the heating at the stated temperature for 15 to 30 minutes. Adjust the alkalinity if necessary, with additional benzoic acid, to bring the solution to practically exact neutrality. Filter at the same temperature; and evaporate and dry in the usual manner.

As specifically applied to the production of sodium benzoate, there may be used, for 1000 pounds of a 10% sodium benzoate solution, a solution of 2 pounds of potassium permanganate dissolved in 50 pounds of water; the heating with the permanganate may be for 15 minutes at 80 to 95° C.; there may be added 5 pounds of activated carbon and the continued heating may be at said temperature for 30 minutes.

Although it may at times be possible to omit the activated carbon treatment, the use of it affords a better product and allows the use of a slight excess of permanganate, the latter step in turn giving a better product.

We claim:

1. The method of manufacturing undiscolored water soluble white benzoates from crude benzoic acid made from phthalic acid which includes heating an aqueous solution of the benzoate with sufficient alkali metal permanganate to oxidize impurities.

2. The method of manufacturing undiscolored water soluble white benzoates from crude benzoic acid made from phthalic acid which includes heating an aqueous solution of the benzoate with sufficient alkali metal permanganate to oxidize impurities, adding carbon to the solution, and continuing the heating in the presence thereof.

3. The method of manufacturing undiscolored water soluble white benzoates from crude benzoic acid made from phthalic acid which includes heating an aqueous solution of the benzoate with sufficient alkali metal permanganate to oxidize impurities, adding activated carbon to the solution, and continuing the heating in the presence thereof.

4. The method of procuring undiscolored alkali metal benzoate from alkali metal benzoate which has been prepared by the neutralization of benzoic acid made from phthalic acid which method comprises adding to substantially 2000 pounds of an aqueous solution of the so-prepared benzoate sufficient alkali metal permanganate to impart a red color to the solution, mantaining a temperature of 80 to 95° C. for 5 to 15 minutes, adding 5 to 10 pounds of activated carbon and continuing the heating at said temperature for 15 to 30 minutes, filtering, and isolating the benzoate.

5. The method of procuring undiscolored sodium benzoate from sodium benzoate which has been prepared by the neutralization of benzoic acid made from phthalic acid which method comprises adding to substantially 1000 pounds of a 10%–20% aqueous solution of the so-prepared benzoate, a solution of 2 pounds of potassium permanganate in 50 pounds of water, maintaining a temperature of 85 to 95° C. for 15 minutes, adding 5 pounds of activated carbon and continuing the heating at said temperature for 30 minutes, filtering, and isolating the benzoate.

In testimony whereof we affix our signatures.

WILLIAM S. CALCOTT.
HERBERT W. DAUDT.